Jan. 4, 1966  A. E. CAMPBELL  3,227,138

PET TOILET

Filed Sept. 10, 1964

United States Patent Office 3,227,138
Patented Jan. 4, 1966

3,227,138
PET TOILET
Alvin E. Campbell, Spring Arbor, Mich. (% International Standard Engineering Inc., APO 757, New York, N.Y.)
Filed Sept. 10, 1964, Ser. No. 395,617
4 Claims. (Cl. 119—1)

This invention comprises improvements relating to pet toilets and has for its object to provide a toilet which is automatically flushed after use, on the animal leaving the toilet.

Figure 1:
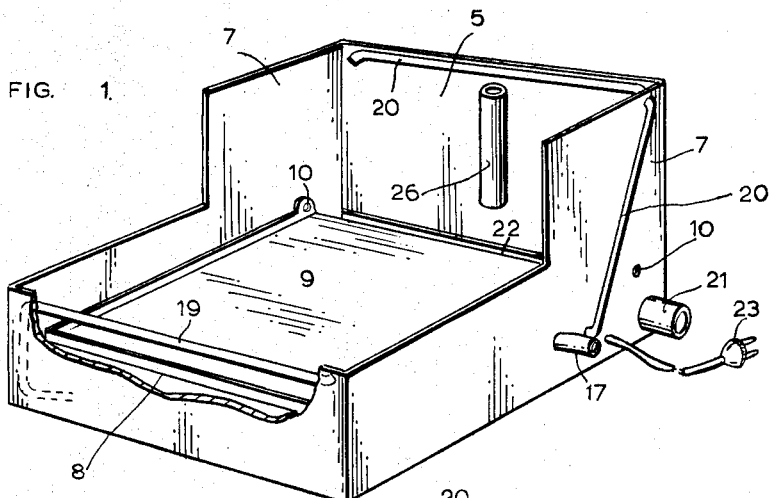
FIGURE 1 is a perspective view of a pet toilet according to this invention.
Figure 2:
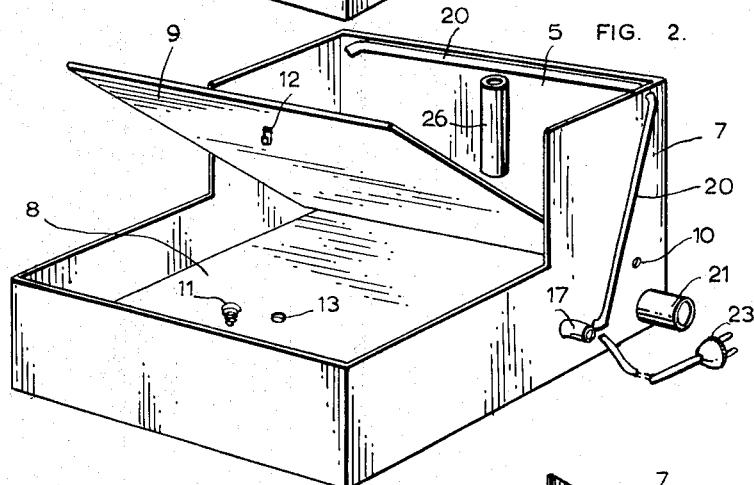
FIGURE 2 is a similar view to that shown in FIGURE 1, with the pivoted floor raised.
Figure 3:
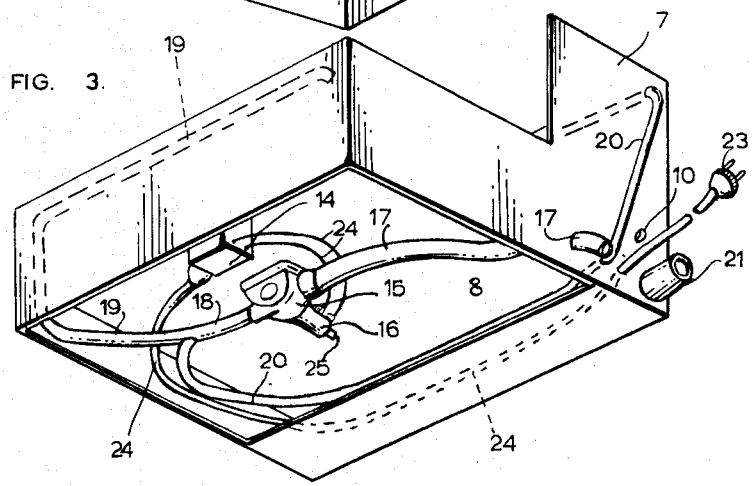
FIGURE 3 is a perspective view of the underside of the toilet.

In the embodiment of this invention as shown upon the accompanying drawing, upwardly extending confining means are provided, the rear wall 5 of which is extended upwardly, whilst the two side walls 6 are substantially of an L-shape. The vertical parts 7 thereof being complementary to the rear wall 5, thus forming rear and side protections to the toilet.

The floor of the toilet is formed as a fixed partition 8, whilst mounted above this partition 8 is a platform 9 pivotally mounted on the two side pivots 10.

Secured at the forward end to the top of the partition 8 is a compression spring 11, which is adapted to support the forward end of the platform 9.

Mounted on the underside of the pivoted platform 9 is a switch operating member 12 which is adapted to extend through the aperture 13 in the partition 8 to operate a switch 14 on the underside thereof.

A water flushing system is provided for the toilet, which comprises a control valve 15, which is operated by the solenoid 16 for controlling the flushing of the toilet as hereinafter explained.

A main water supply 17 is connected to the valve 15, while the outlet 18 from the valve 15 is provided with branches 19, 20, which where they are located above the partition 8 are perforated to provide the necessary spray for flushing the toilet.

A waste outlet 21 is provided at the rear end of the toilet which communicates with a trough 22, whereby waste matter on the pivoted platform 9 can be flushed away through the outlet 21.

The solenoid 16, controlling the valve 15 is coupled to an electric supply through the plug 23, leads 24 and switch 14 which is also in circuit with the solenoid 16.

In operation, the animal takes up a position on the pivoted platform 9, which is thereby depressed against the action of the compression spring 11. This downward movement causes the switch operating member 12 to engage the switch 14, causing said member to take up a position for moving a trip in the switch to such a position as to momentarily complete the circuit to the solenoid 16 on the animal leaving the pivoted platform 9.

On the completion of the circuit to the solenoid 16 on the animal leaving the pivoted platform 9, the solenoid 16 is energised and opens the control valve 15, permitting a flow of flushing water through the branches 19, 20.

The return of the valve 15 to its closed position, is retarded by the action of any suitable retarding means used with such solenoids, the retarding means being preferably adjustable by a control 25 in order that the period of flushing may be varied to the required period.

Mounted on the rear wall 5 of the upwardly extending confining means is a tubular part 26, which in order to attract the pet to use the toilet may be sensitized by rubbing thereon soil which has been urinated on.

What I claim is:

1. A pet toilet, comprising upwardly extending confining means, a fixed horizontally disposed partition secured within said confining means, a platform pivoted at one end mounted above said horizontally disposed partition, resilient means interposed between said partition and the pivoted platform to normally retain the free end of the pivoted platform in a raised position, a water flushing system arranged within the upwardly extending confining means, an electric switch coacting with the pivoted platform, and a control valve operating in conjunction with the flushing system which valve is operated by the electric switch to flush the toilet on an animal leaving the pivoted platform.

2. A pet toilet, comprising upwardly extending confining means, a fixed horizontally disposed partition secured within said confining means, a platform pivoted at one end mounted above said horizontally disposed partition, resilient means interposed between said partition and the pivoted platform to normally retain the free end of the pivoted platform in a raised position, a water flushing system arranged within the upwardly extending confining means, an electric switch coacting with the pivoted platform, a control valve for the flushing system, and a solenoid for operating the control valve on the animal leaving the pivoted platform.

3. A pet toilet, as defined in claim 2, wherein means are provided for controlling the period in which the control valve for the flushing system is open.

4. A pet toilet, comprising upwardly extending confining means, a fixed horizontally disposed partition secured within said confining means, a platform pivoted at one end mounted above said horizontally disposed partition, resilient means interposed between said partition and the pivoted platform to normally retain the free end of the pivoted platform in a raised position, water flushing means arranged around the upwardly extending confining means, a control valve connected to said flushing means, an electric solenoid for operating the control valve, means for regulating the period during which said valve may remain open, an electric switch arranged in circuit with said solenoid and the power supply and a control member coacting with said electric switch whereby on an animal mounting the pivoted platform, said switch control member coacts with said switch, ensuring that on the animal leaving the pivoted platform the electric circuit to the solenoid is momentarily completed and the control valve opened to permit of the toilet being flushed for a predetermined period of time.

References Cited by the Examiner
UNITED STATES PATENTS 2,204,416  6/1940  Kramer _____ 119—1
3,066,314  12/1962  Filliung _____ 4—101

FOREIGN PATENTS 1,238,476  7/1960  France.

SAMUEL KOREN, Primary Examiner.
HUGH R. CHAMBLEE, Examiner.